United States Patent [19]
Hogg

[11] Patent Number: 5,814,573
[45] Date of Patent: Sep. 29, 1998

[54] PRODUCTION OF SIALON

[75] Inventor: Christopher Stirling Hogg, Bodmin, England

[73] Assignee: ECC International Ltd., England

[21] Appl. No.: 593,641

[22] Filed: Jan. 29, 1996

[30] Foreign Application Priority Data

Jan. 30, 1995 [GB] United Kingdom ............... 9501745

[51] Int. Cl.$^6$ ............................................. C04B 35/58
[52] U.S. Cl. ............................................. 501/98.1
[58] Field of Search .................................. 501/98

[56] References Cited

U.S. PATENT DOCUMENTS

| | | | |
|---|---|---|---|
| 3,960,581 | 6/1976 | Cutler ......................... | 501/98 |
| 4,499,193 | 2/1985 | Phelps et al. ............... | 501/98 |
| 4,511,666 | 4/1985 | Phelps et al. ............... | 501/98 |
| 5,110,773 | 5/1992 | Corral et al. ................ | 501/98 |

FOREIGN PATENT DOCUMENTS

| | | |
|---|---|---|
| 0187431AI | 1/1985 | European Pat. Off. . |
| 0188038AI | 1/1985 | European Pat. Off. . |
| 0289440 A1 | 4/1988 | European Pat. Off. . |

OTHER PUBLICATIONS

Patent Abstracts of Japan, vol. 006, No. 244 (C–138), Dec. 2, 1982 & JP–A–57 145012 (Showa Denko KK; others:02), Sep. 7, 1982—abstract.

Patent Abstracts of Japan, vol. 006, No. 244 (C–138), Dec. 2, 1982 & JP–A–57 145011 (Showa Denko KK; others:02), Sep. 7, 1982—abstract.

Sprechsaal, vol. 117, No. 7, Jul. 1984, Coburg (DE), pp. 627–629, XP002001448 F.K. Van Dijen et al.: "Large scale production of fine non–oxide ceramic powders."

WPI Abstract Accession No. 84–103780/17 & JP 59045912A (Kawasaki Rozai KK)—See attached abstract.

Journal of the Japan Society of Powder Metallurgy vol. 40, No. 12, 12 Dec. 1993 pp. 1223 to 1227 (See abstract).

WPI 83–50388 (JP 58/064267) (Kawasaki Rozai KK).

Primary Examiner—Deborah Jones
Attorney, Agent, or Firm—Suzanne Kikel

[57] ABSTRACT

A process is described for preparing β'-sialon comprising heating a mixture of particles comprising from 70% to 90% by weight of particles of an aluminosilicate material and from 30% to 10% by weight of particles of a carbonaceous material at a temperature in the range of from 1300° C. to 1600° C. in nitrogen in a vessel in a manner such that the particles are in substantially continuous motion relative to each other and relative to the nitrogen. The residence time of the particles in the vessel does not exceed 3 hours.

18 Claims, No Drawings

PRODUCTION OF SIALON

BACKGROUND OF THE INVENTION

1. Field of the Invention

This invention relates to a process for preparing advanced ceramic materials of the sialon type.

Advanced ceramics are used in a wide range of applications, for example in industrial wear parts and bearings, refractories, welding components and molten metal handling materials, cutting tools for metal turning, dies for metal extrusion and wire pulling, military applications and body armour, electronics and composite materials. In aggressive and high temperature environments, the corrosion resistance, strength, toughness and wear resistance of advanced ceramics offer considerable advantages over the sophisticated metal alloys currently in use.

One particular group of advanced ceramics which is currently attracting increased attention is that known as the sialons. These materials are closely related to silicon nitride, but have certain superior properties and are easier to form into components, when compared with silicon nitride. In order to form silicon nitride into an end product, a temperature typically of 1800° C. and a pressure of 30 MPa (2 tons per square inch) are required. As a result, generally only small items of relatively simple shape are made from silicon nitride. If alumina is incorporated into silicon nitride, the resultant compound can be sintered at more moderate temperatures and pressures. The alumina is accommodated in the crystal lattice without changing the overall silicon nitride structure, and the product material combines the chemical resistance of alumina with the mechanical properties of silicon nitride, thus increasing its value and usefulness in industry. The term "sialon", which is now widely used to identify this type of material, is derived from the chemical symbols Si, Al, O and N of its constituent elements.

More recently the type of sialon which has the crystal structure of β-silicon nitride has come to be known as β'-sialon to distinguish it from α-sialon which has the normally unstable structure of α-silicon nitride and which is stabilised by the dissolution of certain metal ions into interstitial sites and by the partial substitution of aluminium for silicon and oxygen for nitrogen.

2. Brief Description of the Prior Art

U.S. Pat. No. 3,960,581 (Cutler) describes a method for preparing sialon in which an intimate mixture of a clay comprising aluminium oxide in the range from 40% to 20% by weight and silicon dioxide in the range from 46% to 70% by weight and charcoal was heated in an enclosed chamber at 1450° C. under an atmosphere of nitrogen gas for 3 hours. The carbon remaining in the reaction mixture was then burned off in air at 700° C. for 2 hours. The resultant powder was pressed into a disc and sintered by heating in a nitrogen atmosphere for 2 hours. The process described is of the batch type.

U.S. Pat. No. 5,110,773 (Corral et al.) describes a process for producing β'-sialon in which a kaolin clay is calcined at 1020° C. and subsequently treated with a 10% solution of sodium hydroxide to remove some of the silicon dioxide and form a pre-mullitic material. This pre-mullitic material was finely ground to a size of 10 μm or smaller and the ground material homogenised with finely ground carbon. The resultant mixture was formed into a shaped body which was heated at a temperature in the range of from 1350° to 1500° C. for from 0.5 to 6 hours in the presence of nitrogen to form β'-sialon. The heating stage may be carried out in various types of furnace, including tunnel furnaces for continuous operation.

Japanese Published Patent Applications Nos. 57/145012, 58/049669 and 58/064267 describe a process for the continuous production of sialon in which pellets containing carbon powder and aluminosilicate clay are mixed with a carbonaceous material and the mixture is fed to the top of a heated shaft kiln through which is passes countercurrent to a stream of nitrogen gas, sialon product being continuously withdrawn at the bottom of the kiln.

In the above prior art processes, the reaction to form sialon generally takes place batchwise in a vertical packed bed furnace. This type of furnace can be converted to moving bed operation for continuous production, but, under these conditions, gas-solid contact is relatively poor and, especially in beds of large diameter, it is very difficult to maintain a uniform temperature over the cross section of the bed. The residence time of the reaction mixture in a moving bed furnace of this type would be of the order of from 4 to 24 hours.

Various prior art references, eg. EP0188038, EP0187431, U.S. Pat. No. 4,511,666, U.S. Pat. No. 449,193, WPI abstract of JP59045912A and J.Jap. Soc, Powder Mettallurgy Vol 40, December 1993 pp 1223 to 1227 describe the use of a fluidised bed to produce various sialons or similar compounds but none describes the use of starting material specially selected as described hereinafter for use in the process of the present invention. The prior art does not therefore show the benefits obtained by using such starting material.

SUMMARY OF THE INVENTION

According to the present invention, there is provided a process for preparing β'-sialon, which process comprises heating a mixture of particles comprising from 70% to 90% by weight of particles of an aluminosilicate material and from 30% to 10% by weight of particles of a carbonaceous material at a temperature in the range of from 1300° C. to 1600° C. in nitrogen in a vessel in a manner such that the particles are in substantially continuous motion relative to each other and to the nitrogen, and wherein the residence time of the particles in the vessel does not exceed three hours, wherein the aluminosilicate material comprises a clay mineral which has been calcined.

The residence time is defined as the average time the particles are present in the said vessel.

DESCRIPTION OF THE INVENTION

In the prior art described above the use of a calcined mineral as the starting material to form the β'-sialon is not suggested especially where the vessel is selected to provide substantial continuous motion of the particles and, as a result, the process of the present invention unexpectedly shows various advantages over prior art processes. The mineral may, of course, be obtained from naturally occurring sources and may be provided more cheaply than separate materials such as silica and alumina as used in the prior art. Also, use of a calcined clay provides an intimate combination of silica and alumina on an atomic scale which is not obtained when silica and alumina are mixed together and is therefore more effective in providing the required reaction and product composition. Furthermore, it is preferable to use a particulate material having a particle size of less than about 50 μm more preferably having particles at least 90% of which have an equivalent spherical diameter of less than 5 μm in the formation of sialon in the process of the present invention. Metakandite, especially metakaolin, provides a suitable material. It can be obtained in a suitable form following a relatively inexpensive known calcination process and provided in such a fine particle form easily and relatively inexpensively using well developed techniques eg. wet grinding. On the other hand, the prior art starting materials, in particular silica and alumina, would be relatively expensive to produce in a suitable fine particle form. For operation of the sialon producing process in a vessel providing a substantially continuous particle motion, eg. a fluidised bed, we have found that it is advantageous to form pellets of a mixture of the aluminosilicate material and the carbonaceous material, and calcined mineral particles, eg. metakandite, provide a suitable material from which such a mixture can be produced. The use of a vessel in which the particles are in substantially continuous motion relative to one another and to the nitrogen avoids the problems associated with prior art packed bed furnaces. The continuous motion permits a more efficient reaction with better solid/gas content to take place more quickly and cheaply than with a packed bed, producing a product which has a more uniform composition with less impurities and unreacted components.

In the process of the present invention, the reaction mixture of particles preferably comprises from 75% to 85% by weight of particles of the aluminosilicate material and from 25% to 15% by weight of particles of the carbonaceous material.

The calcined aluminosilicate material may, for example, comprise a calcined kandite clay, such as kaolinite, nacrite, dickite or halloysite, although it may alternatively or in addition comprise a calcined smectite clay, such as bentonite, montmorillonite, hectorite, saponite or beidellite, or pyrophyllite, sillimanite or mullite. One or more of the kandite clays (optionally together with one or more of the smectite clays) are especially preferred. Generally, naturally occurring aluminosilicate materials consist of one or more of these minerals associated with varying amounts of impurities. In the case of kandite clays, the calcination may be performed by heating at a temperature in the range of from 450° C. to 1300° C. preferably from 700° C. to 1100° C. for a time such that the loss on ignition of the calcined product at 1000° C. for 2 hours is not more than 1% by weight.

The process according to the present invention may further comprise the step of comminuting the carbonaceous material to a particle size distribution such that at least 20% by weight of the carbonaceous material consists of particles having an equivalent spherical diameter of less than 2 $\mu$m, the comminuting step being carried out before mixing the carbonaceous material with the aluminosilicate material.

The said vessel in which the reaction in the process of the present invention is carried out is preferably an enclosed furnace. "Enclosed" in this context means sealed in such a way that air does not have free access to the interior or contents of the vessel, and the nitrogen is constrained to pass through the vessel and cannot escape freely into the atmosphere.

The said reaction vessel may be a rotary type furnace in which a tubular chamber rotates about its longitudinal axis which may be inclined at a small angle, preferably in the range of from about 10 to 100, eg. 5°, to the horizontal. The speed of rotation is conveniently in the range of from about 1 to about 5 rpm. Under these conditions the bed of the reaction mixture undergoes a continuous tumbling motion with consequent good solid/gas contact. Alternatively, as noted above, the said reaction vessel may comprise a fluidised bed type furnace which imparts a boiling motion to the particles of the reaction mixture, and again promotes very good solid/gas contact.

Operation of the process according to the present invention using a reaction vessel which provides a fluidised bed is preferred. In this case, the aluminosilicate starting material used in the reaction is preferably a metakandite which has been formed by heating a kandite clay mineral to a temperature in the range from 450° C. to 950° C. for a time such that the loss on ignition for two hours at 1000° C. of a sample of the calcined material is less than 1% by weight.

As noted above, conveniently, a mixture of the calcined aluminosilicate material and carbon is formed and used as a feed material for supply to the said reaction vessel. Such feed material preferably comprises granules having an average size in the range 0.2 mm to 5.0 mm, preferably 0.2 mm to 1.0 mm, of a dried mixture of the aluminosilicate, preferably metakandite, and the carbon. Preferably, the carbon included in the mixture comprises finely divided carbon which has an average particle diameter less than 500 nm, preferably less than 100 nm, and a carbon content of greater than 98% by weight. Carbon black obtained from the burning of hydrocarbons is a suitable carbon source.

Preferably, the said aluminosilicate/carbon mixture is formed by preparing an aqueous slurry of the calcined aluminosilicate and preparing an aqueous slurry of the carbon and mixing the two slurries. Each of the slurries or the slurry mixture may include one or more additives well known in the art in the formation of aqueous slurries, eg. dispersing agent. The preferred dispersing agent for the aluminosilicate is an ammonium polyacrylate or polymethacrylate in an amount of from 0.05% to 2.0% by weight, based on the weight of the dry aluminosilicate. The preferred dispersing agent for the carbon is a surfactant in an amount of from 0.05% to 20% by weight, based on the weight of dry carbon.

Alternatively, the aluminosilicate and the carbon can be combined together into a single aqueous suspension.

The mixed slurry is preferably treated in a known way to break up agglomerates, eg. by wet ball milling or attrition grinding. The finely ground suspension is preferably dried, eg. using spray drying, and then pelletised to give the required granule size mentioned above. The most preferred granule size is from 0.3 mm to 0.7 mm, especially about 0.5 mm. If the granules are too small they may be blown out of the reaction vessel when introduced, especially where the reaction vessel provides a fluidised bed.

The said reaction vessel may have a single stage zone at which the sialon producing reaction is carried out, or alternatively, as in the prior art, it may have two or more zones in which different stages of treatment of the reacting materials are carried out in series. Where the said vessel comprises a fluidised bed furnace, the solid feed material may be introduced in the upper part of the furnace, eg. at the top.

The use of a metakandite, rather than a hydrous or hydroxylated clay, in the feed material to the reaction vessel gives important benefits. If hydrous or hydroxylated clay were used in such a process a significant amount of heat would be lost in dehydroxylating the clay and it would be difficult to maintain the required temperatures and/or a greater energy input would be required. This problem is avoided by using a dried metakandite.

The rate at which the nitrogen is supplied, in liters per minute, is preferably at least 35 times, and even more preferably not more than 400 times, the rate at which the clay-carbon mixture is supplied to the reaction vessel in kg per hour.

In particular, nitrogen delivery rates sufficient to keep the concentration of carbon monoxide produced during the course of the process below about 10% are preferred. The nitrogen delivery rate may for example be in the range 40 to 60 kg per minute per 10 kg per minute of clay-carbon mixture. The nitrogen may optionally be diluted with an inert gas, eg. helium. The nitrogen may be admitted at a temperature in the range 1700° C. to 1800° C.

Advantageously, the residence time of the mixture in the vessel is in the range of from 30 minutes to 2 hours.

EXAMPLES OF THE PREFERRED EMBODIMENTS

Embodiments of present invention will now be described by way of example only with reference to the following examples:

Example 1

Three different blends were prepared of 77 parts by weight of a finely divided calcined kaolinitic clay with 23 parts by weight of a finely divided carbonaceous material.

The following three calcined clays were used:

Calcined clay A was prepared by calcining a secondary kaolin from Georgia, U.S.A. It had a particle size distribution such that 93% by weight consisted of particles having an equivalent spherical diameter smaller than 2 μm and a level of impurities such that its $K_2O$ content was 0.09% by weight and its $Fe_2O_3$ content was 0.93% by weight.

Calcined clay B was prepared by calcining a primary kaolin from South Devon, United Kingdom. It had a particle size distribution such that 57% by weight consisted of particles having an equivalent spherical diameter smaller than 2 μm and a level of impurities such that its $K_2O$ content was 1.99% by weight and its $Fe_2O_3$ content was 0.59% by weight.

Calcined clay C was prepared by calcining a kaolinitic ball clay from South Devon, United Kingdom. It had a particle size distribution such that 39% by weight consisted of particles having an equivalent spherical diameter smaller than 2 μm and a level of impurities such that its $K_2O$ content was 0.63% by weight and its $Fe_2O_3$ content was 4.32% by weight.

The carbonaceous material was either a carbon black which was supplied as an aqueous dispersion of particles having an average particle diameter of about 20 nm under the trade name "PFE ACTION A5", or anthracite which had been ground to a particle size distribution such that 27% by weight consisted of particles having an equivalent spherical diameter smaller than 2 μm and a specific surface area of 23.4 $m^2g^{-1}$.

Each blend was prepared by mixing aqueous suspensions of the calcined clay and the carbonaceous material. When the carbonaceous material was carbon black the mixed suspension was dried in a spray drier. When the carbonaceous material was ground anthracite the mixed suspension was filtered and the cake dried overnight in an oven. In each case the resultant dried product was milled to a fine powder.

100 g of each powdered blend was introduced into the feed end of a rotary horizontal tube furnace equipped with a mullite refractory tube of length 1200 mm and internal diameter 78 mm, closed with loose-fitting refractory plugs. The mullite tube was mounted on rollers positioned at either end of the furnace, and was rotated at a speed of 2.5 rpm. A zone length of 600 mm within the furnace was maintained at a temperature of 1500° C. The position of the plugs within the refractory tube was such as to retain the powdered blend within the zone of maximum temperature. In each case, the powdered blend was retained in this zone for 60 minutes. Throughout the experiments, a stream of nitrogen gas was passed through the furnace at rate of 10 liters per minute.

The product from each run was examined by the technique of quantitative X-ray diffraction. The product of the carbothermal reduction of calcined clay A with carbon black was found to contain more than 95% by weight of β'-sialon, the remainder being glass. The products of the carbothermal reduction of calcined clay B with carbon black and calcined clay C with anthracite were both found to contain more than 95% by weight of β'-sialon, the remainder being a mixture of mainly glass with a trace of mullite. The product from calcined clay C also contained a small quantity of ferro-silicon.

Example 2

A blend was prepared of 79 parts by weight of a finely divided calcined kaolinitic clay with 21 parts by weight of finely divided carbonaceous material.

The calcined kaolinitic clay was calcined clay A as described in Example 1.

The carbonaceous material was a carbon black supplied under the trade name "RAVEN P-FE" by Columbian Carbon, Deutschland GmbH and having an average particle diameter of about 21 nm and a specific surface area, as measured by the BET nitrogen adsorption method, of 117 $m^2.g^{-1}$.

The blend was prepared by mixing aqueous suspensions of the calcined clay and of the carbonaceous material in a ball mill and drying the mixed suspension in a spray drier. The resultant dry powder was pelletised in a pan pelletiser and sieved to give pellets in the size range from 0.6 to 2.0 mm.

The pelletised blend was introduced into a pilot scale rotary furnace using a screw feeder. The furnace was fitted with a mullite refractory tube of length 1575 mm and internal diameter 78 mm. The furnace tube, inclined with its longitudinal axis at an angle of 0.5° to the horizontal, was rotated at a speed of 1.5 rpm. A zone of length 600 mm within the furnace tube was maintained at a temperature of 1500° C.

The furnace tube was fitted with rotary seals at each end so that gas could be passed through the tube and the exhaust gas ducted away, and to prevent the ingress of air. Throughout the experiment, a stream of nitrogen gas was passed through the furnace at a rate of 5 $l.min^{-1}$. The flow of nitrogen gas was counter-current to the movement of solid material in the rotating tube.

The pelletised blend was introduced continuously at the rate of 1.5 $g.min^{-1}$ into the feed end of the pilot scale rotary furnace over a period of 135 minutes. The pelletised blend was able to pass through the furnace tube in a continuous fashion as the tube rotated. The mean residence time within the zone of maximum temperature was calculated using standard formulae to be 85 minutes.

During this run, the carbon monoxide content of the nitrogen gas leaving the furnace was continuously analysed and was found to reach a maximum value of 6.8% by volume.

The product of this run was examined by the technique of quantitative X-ray diffraction and was found to contain almost 100% by weight of β'-sialon, with only a trace of glass.

Example 3

A blend of calcined kaolinitic clay and carbonaceous material was prepared as in EXAMPLE 2, with the exception that the product from the pan pelletiser was sieved to give pellets in the size range 0.125–0.30 mm. The pellets were reacted in nitrogen in a fluidised bed furnace at 1500° C. to give SiAlON, as follows.

The fluid bed furnace was constructed from a vertically mounted tube furnace fitted with a mullite refractory tube of length 1200 mm and internal diameter 78 mm. A zone of length 600 mm within the furnace tube was maintained at a temperature of 1500° C. The top of the mullite refractory tube was closed with a porous refractory plug, through which passed a refractory tube to allow the introduction of the granules of feed material.

The lower half of the refractory tube was packed with alumina beads 3–5 mm diameter. On top of these beads was a thinner bed, approximately 10 mm thick, of smaller beads, 0.5–1 mm diameter. Nitrogen gas was passed up the refractory tube, through the bed of alumina beads. The beads provided a tortuous path for the nitrogen gas, allowing the temperature of the gas to attain that of the furnace. The bed of finer beads acted as a distributor for the nitrogen gas to ensure a uniform flow through the granules of feed material.

Nitrogen gas was introduced into the lower end of the mullite refractory tube at a flow rate of 5 l/m, corresponding to a linear velocity in the tube of approximately 0.017 m/s. Calculations and experiments at room temperature indicate that this flow rate is in excess of the amount needed to fluidise the bed of granules, but ensures that the concentration of CO in the gas leaving the furnace does not become excessive and rate-limiting.

100 g of the pelletised feed granules were introduced into the fluid bed furnace over a period of 10 minutes using a vibratory feeder. The granules were allowed to remain in the furnace at 1500° C. for a period of 2 hours 10 minutes, at which point the nitrogen flow rate was decreased to 2 l/m and the furnace allowed to cool to room temperature.

When cold, the weight of product removed from the furnace was 50 g. It was examined by the technique of X-ray diffraction, and was estimated to contain 94 mass % of β' SiAlON, 5 mass % of 15R phase and 1 mass % of ferro-silicon.

Example 4

A blend was prepared of 81.2 parts by weight of a kaolinitic clay with 18.8 parts by weight of a finely divided carbonaceous material.

The kaolinitic clay was a processed secondary kaolin from Georgia, U.S.A. It had a particle size distribution such that 92% by weight consisted of particles having an equivalent spherical diameter smaller than 2 $\mu$m, with a $K_2O$ content of 0.28 mass % and an $Fe_2O_3$ content of 0.56 mass %, and a Loss on Ignition of 14.0 mass %.

The carbonaceous material was carbon black as used in EXAMPLE 2 and in EXAMPLE 3. It was dispersed in water with the aid of a surfactant, sold under the trade designation HYPERMER CG6, by ICI.

The blend was prepared by mixing aqueous suspensions of the kaolinitic clay and the carbonaceous material, and drying the mixed suspension in a spray drier. The resulting dry powder was pelletised in a pan pelletiser and sieved to give pellets in the size range from 0.30 to 0.60 mm.

100 g of the pellets were introduced into the fluid bed furnace described in EXAMPLE 4. The temperature of the furnace was initially at 1350° C., but was raised to 1500° C. over a period of 2 hours after the introduction of the pellets. The flow rate of nitrogen into the furnace was initially at 2 l min$^{-1}$ during the introduction of the pellets, but was then increased to 5 l min$^{-1}$ for the remainder of the experiment.

The carbon monoxide content of the nitrogen gas leaving the top of the furnace tube was monitored continuously, reaching a maximum concentration of 18.7% by volume while the nitrogen gas flow rate was 2 l min$^{-1}$ and before this was increased to 5 l min$^{31}$ $^1$. After a period of 2 hours and 48 minutes, the CO concentration in the nitrogen had declined to a value of 0.1% by volume, the reaction was deemed to have finished. The nitrogen flow rate was decreased to 2 l min$^{-1}$, and the furnace allowed to cool to room temperature.

When cold, the weight of product removed from the furnace was 47 g. It was examined by the technique of X-ray diffraction, and was estimated to contain 92 mass % of β' SiAlON and 2 mass % of each of X-phase, 15R phase, ferro-silicon and alumina.

I claim:

1. A process for preparing β'-sialon, which process comprises heating a mixture of particles comprising from 70% to 90% by weight of particles of an aluminosilicate material and from 30% to 10% by weight of particles of a carbonaceous material at a temperature in the range of from 1300° C. to 1600° C. in nitrogen in a reaction vessel and causing said particles to be in substantially continuous motion relative to each other and relative to the nitrogen and wherein the residence time of the particles in the reaction vessel does not exceed three hours, and wherein the aluminosilicate material comprises a kandite clay which has been calcined at a temperature of from 450° C. to 1300° C. such that loss on ignition of the calcined clay at 1000° C. for 2 hours is not more than 1% by weight.

2. A process according to claim 1, wherein the mixture of particles comprises from 75% to 85% by weight of particles of the aluminosilicate material and wherein the mixture of particles comprises from 25% to 15% by weight of particles of the carbonaceous material.

3. A process according to claim 1 wherein the carbonaceous material comprises finely divided carbon or carbon black.

4. A process according to claim 3 and further comprising the step of comminuting the carbonaceous material to a particle size distribution such that at least 20% by weight of the carbon consists of particles having an equivalent spherical diameter of less than 2 $\mu$m, the comminuting step being carried out before mixing the carbon with the aluminosilicate material.

5. A process according to claim 1 and wherein the process is carried out in an enclosed furnace.

6. A process according to claim 5 and wherein the enclosed furnace comprises a rotary furnace having a longitudinal axis about which it rotates.

7. A process according to claim 5 and wherein the enclosed furnace comprises a fluidised bed.

8. A process as claimed in claim 1 and wherein the mixture of particles comprises granules comprising the aluminosilicate and carbonaceous materials and wherein the average size of the granules is in the range 0.2 mm to 5.00 mm.

9. A process claimed in claim 8 and wherein the granules comprise metakandite and finely divided carbon.

10. A process as claimed in claim 8 further comprising producing the mixture of particles by preparing a first aqueous slurry comprising particles of the aluminosilicate material and a second aqueous slurry comprising particles of the carbonaceous material and combining said first slurry and said second slurry to form a slurry mixture; drying the slurry mixture; and pelletizing the mixture to form the granules.

11. A process as claimed in claim 5 and wherein the reaction vessel comprises a single stage zone at which the sialon producing reaction is carried out.

12. A process as claimed in claim 5 sand wherein the reaction vessel comprises two or more zones in which different treatments of the mixture are carried out in series.

13. A process as claimed in claim 5 and wherein the reaction vessel comprises a fluidised bed.

14. A process according to claim 1 wherein the rate at which the nitrogen is supplied, in liters per minute, is at least 35 times the rate at which the mixture is supplied in kg per hour.

15. A process according to claim 1 wherein the residence time is from 30 minutes to 2 hours.

16. A process as claimed in claim 1 and wherein the mixture is fed to the reaction vessel and the $\beta'$-sialon is thereby produced in a substantially continuous manner.

17. A $\beta'$-sialon which is a product of the process claimed in claim 1.

18. A process according to claim 1 and wherein said substantially continuous motion of said particles relative to each other and relative to the nitrogen is a vigorous, agitated particle motion caused by said reaction vessel.

* * * * *